Nov. 20, 1956  R. C. RAMSEY  2,770,873
DEVICE FOR FACILITATING MOUNTING AUTOMOBILE WHEELS
Filed Feb. 26, 1953

INVENTOR
R. C. RAMSEY

BY
*R. Hoffman* ATTORNEY

United States Patent Office 2,770,873
Patented Nov. 20, 1956

2,770,873
DEVICE FOR FACILITATING MOUNTING AUTOMOBILE WHEELS

Robert C. Ramsey, Oklahoma City, Okla.

Application February 26, 1953, Serial No. 339,195

1 Claim. (Cl. 29—273)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a simple tool to be used in helping the mounting of automobile or truck wheels. It is the general experience in removing and replacing wheels on motor vehicles that the weight and unwieldy nature of the wheels make the task of mounting them an extremely difficult one. The problem becomes exceedingly critical when larger passenger cars and trucks are involved.

It is therefore an object of this invention to provide a tool that will enable anybody to mount a wheel with a minimum of difficulty.

Other objects will be apparent from the following description of the invention and how it operates.

Figure 2:
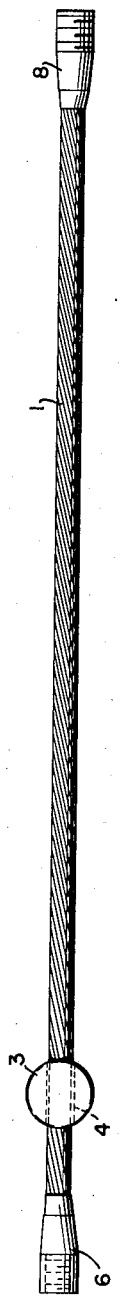
Figure 2 is a plan view.
Figure 1:
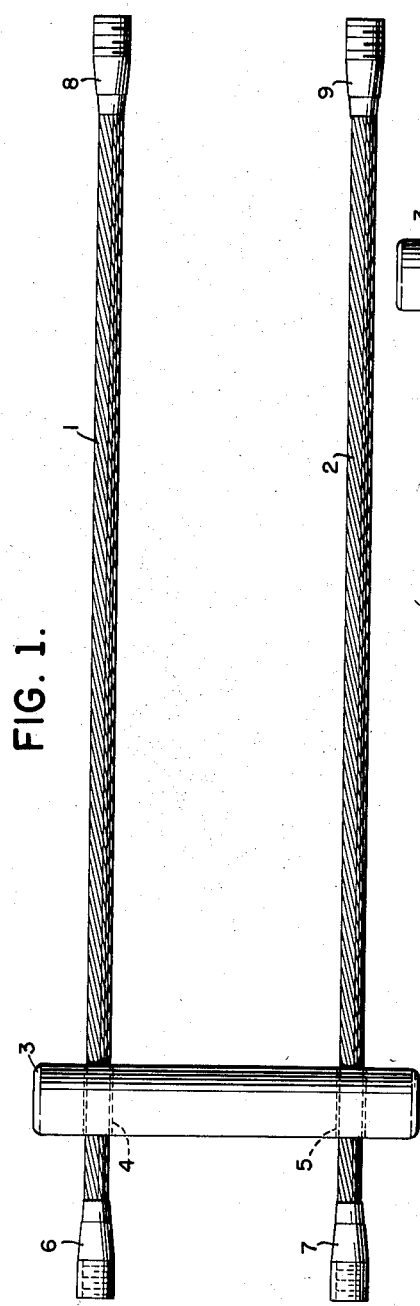
Figure 1 is a side elevation of one form of the device and shows the structural relationship of the component parts.
Figure 3:
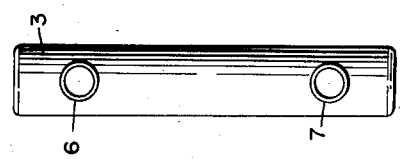
Figure 3 is a side elevation of the device.
Figure 4:
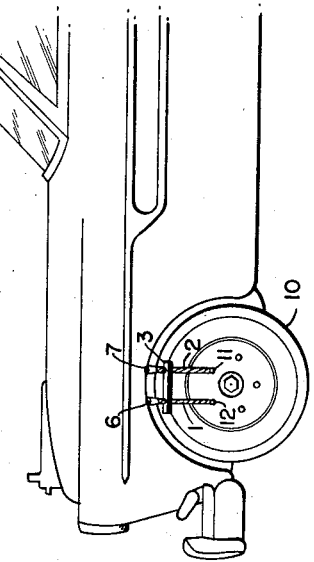
Figure 4 shows the tool actually being used to assist mounting of a wheel.

The tool consists of a handle 3, thaving a pair of parallel transverse holes 4 and 5 near its ends. Through these holes pass flexible steel cables 1 and 2. Secured to the ends of the cables are threaded portions 6, 7, 8 and 9. The exact nature of these threaded portions will depend on the particular automobile with which the tool is to be used. Some cars have right hand threads on the right wheels and left hand threads on the left wheels. Furthermore, some cars use screw type and others use nut type means for securing the wheels to the hubs. Where two different screw type threads are used, right hand male threads may be provided at one end, and similar left hand threads at the other end. Where nut type fasteners are used, the ends of the cables will be provided with female threads. As shown in the drawings, the tool may be used with both types of wheel since male threads 8—9 are provided at one end and female threads 6—7 at the other.

To use the tool one would place the wheel 10 upright on the ground near the hubs and pass the ends of the cables through a pair of upper holes 11—12 in the wheel. The threaded ends of the cables are then secured to the hubs in the same manner as the screws or nuts would be. All that is then required is to lean the wheel against the hub and raise the handle, thereby lifting the wheel off the ground. The wheel slides along the cables until it rests in place. The regular mounting screws or nuts are then used at the remaining holes, after which the cables are unscrewed and replaced by the remaining nuts or screws.

As will be apparent from the above description, replacing a wheel becomes an extremely simple operation when using the invention. It prevents the hub from spinning, guides the wheel into place, and eliminates to a great degree the soiling of clothing.

I claim:

A device for facilitating mounting of automobile wheels comprising: a handle having a pair of transverse parallel holes; a length of flexible cable slidably extending through each hole and adapted to pass through the mounting holes of an automobile wheel; a female threaded member secured at one end of each of said cables and a male threaded member secured at the other end of each of said cables, both male threaded members being on the same side of the handle and each pair of male and female threaded members having the same thread direction, the threaded members being larger than the holes in the handle whereby when said threaded members are secured to the ends of the cables a unitary structure is obtained in which sliding movement of the handle is restricted to between the ends of the cables, said threaded members being adapted to be secured to a wheel hub in place of those normally used to secure the wheel to the hub.

References Cited in the file of this patent

UNITED STATES PATENTS

| | | |
|---|---|---|
| 2,499,758 | Kayfetz | Mar. 7, 1950 |
| 2,555,698 | Masheck | June 5, 1951 |

FOREIGN PATENTS

| | | |
|---|---|---|
| 662,633 | France | Mar. 25, 1929 |
| 681,492 | France | Feb. 3, 1930 |